(12) United States Patent
Kung

(10) Patent No.: US 8,499,190 B2
(45) Date of Patent: Jul. 30, 2013

(54) PORTABLE DEVICE AND BACKUP METHOD THEREOF

(75) Inventor: Gary Kung, Santa Ana, CA (US)

(73) Assignee: I/O Interconnect Inc., Taipei (TW)

( * ) Notice: Subject to any disclaimer, the term of this patent is extended or adjusted under 35 U.S.C. 154(b) by 56 days.

(21) Appl. No.: 13/326,288

(22) Filed: Dec. 14, 2011

(65) Prior Publication Data

US 2012/0233493 A1    Sep. 13, 2012

Related U.S. Application Data

(60) Provisional application No. 61/451,024, filed on Mar. 9, 2011.

(51) Int. Cl.
  *G06F 11/00*   (2006.01)
  *G08C 25/00*   (2006.01)
  *H03M 13/00*   (2006.01)

(52) U.S. Cl.
  USPC ............... 714/4.1; 714/15; 714/6.1; 714/799

(58) Field of Classification Search
  USPC ............... 714/4.1, 4.11, 4.21, 4.3, 4.4, 4.5, 714/6.1, 6.2, 6.21, 6.3, 6.31, 6.32, 13, 15, 714/43, 44, 799, 699
  See application file for complete search history.

(56) References Cited

U.S. PATENT DOCUMENTS

| | | | | |
|---|---|---|---|---|
| 7,251,745 B2 * | 7/2007 | Koch et al. | ...................... | 714/11 |
| 7,328,366 B2 * | 2/2008 | Michelman | ..................... | 714/6.3 |
| 7,844,851 B2 * | 11/2010 | Cosmadopoulos et al. | ... | 714/4.1 |
| 8,151,139 B1 * | 4/2012 | Gordon | ........................... | 714/15 |

\* cited by examiner

*Primary Examiner* — Christine Tu
(74) *Attorney, Agent, or Firm* — Chun-Ming Shih

(57) ABSTRACT

An embodiment of the invention provides a backup method for a portable device to back up a first data to a backup server. The backup method includes steps of determining whether the backup server can be accessed; when the backup server can be accessed, establishing a first data transmission path that the first data would be backed up to the backup server via a third party, a second data transmission path that the first data would be backed up to the backup server via a router, and a third data transmission path that the first data would directly backed up to the backup server; selecting one data transmission path among the first, second and third data transmission paths; and backing up the first data via the selected data transmission path.

10 Claims, 5 Drawing Sheets

PORTABLE DEVICE AND BACKUP METHOD THEREOF

CROSS REFERENCE TO RELATED APPLICATIONS

This application claims the benefit of U.S. Provisional Application No. 61/451,024, filed Mar. 9, 2011, the entirety of which is incorporated by reference herein.

BACKGROUND OF THE INVENTION

1. Field of the Invention

The present invention relates to a data saving method, and more particularly to a data saving method for a portable device via a third party.

2. Description of the Related Art

With the growth in the usage of the mobile device, the smart phone has become more and more popular as it combines the functions of the mobile phone and the personal digital assistant (PDA). The consumers rely on the smart phone, which stores large data therein. Once the smart phone is damaged, the data stored in the smart phone may not to be retrieved and this may cause inconvenience to the consumer. Therefore, demand for backing up data of the portable device, such as the smart phone has increased, leading to problems concerning backing up of data of the portable device. One solution is to directly connect the portable device to a computer or data storage device and store data therein. However, this solution is not convenient for a user.

BRIEF SUMMARY OF THE INVENTION

An embodiment of the invention provides a backup method for a portable device to back up a first data to a backup server. The backup method comprises determining whether the backup server can be accessed; when the backup server can be accessed, establishing a first data transmission path that the first data would be backed up to the backup server via a third party, a second data transmission path that the first data would be backed up to the backup server via a router, and a third data transmission path that the first data would directly backed up to the backup server; selecting one data transmission path among the first, second and third data transmission paths; and backing up the first data via the selected data transmission path.

Another embodiment of the invention provides a portable device. The portable device comprises a backup program and a processor. When the backup program is executed by the processor, the processor determines whether the backup server can be accessed, when the backup server can be accessed, the processor establishes a first data transmission path that the first data would be backed up to the backup server via a third party, a second data transmission path that the first data would be backed up to the backup server via a router, and a third data transmission path that the first data would directly backed up to the backup server, the processor then selects one data transmission path among the first, second and third data transmission paths according to a parameter, and the processor transmits and stores the first data to the backup server via the selected data transmission path.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
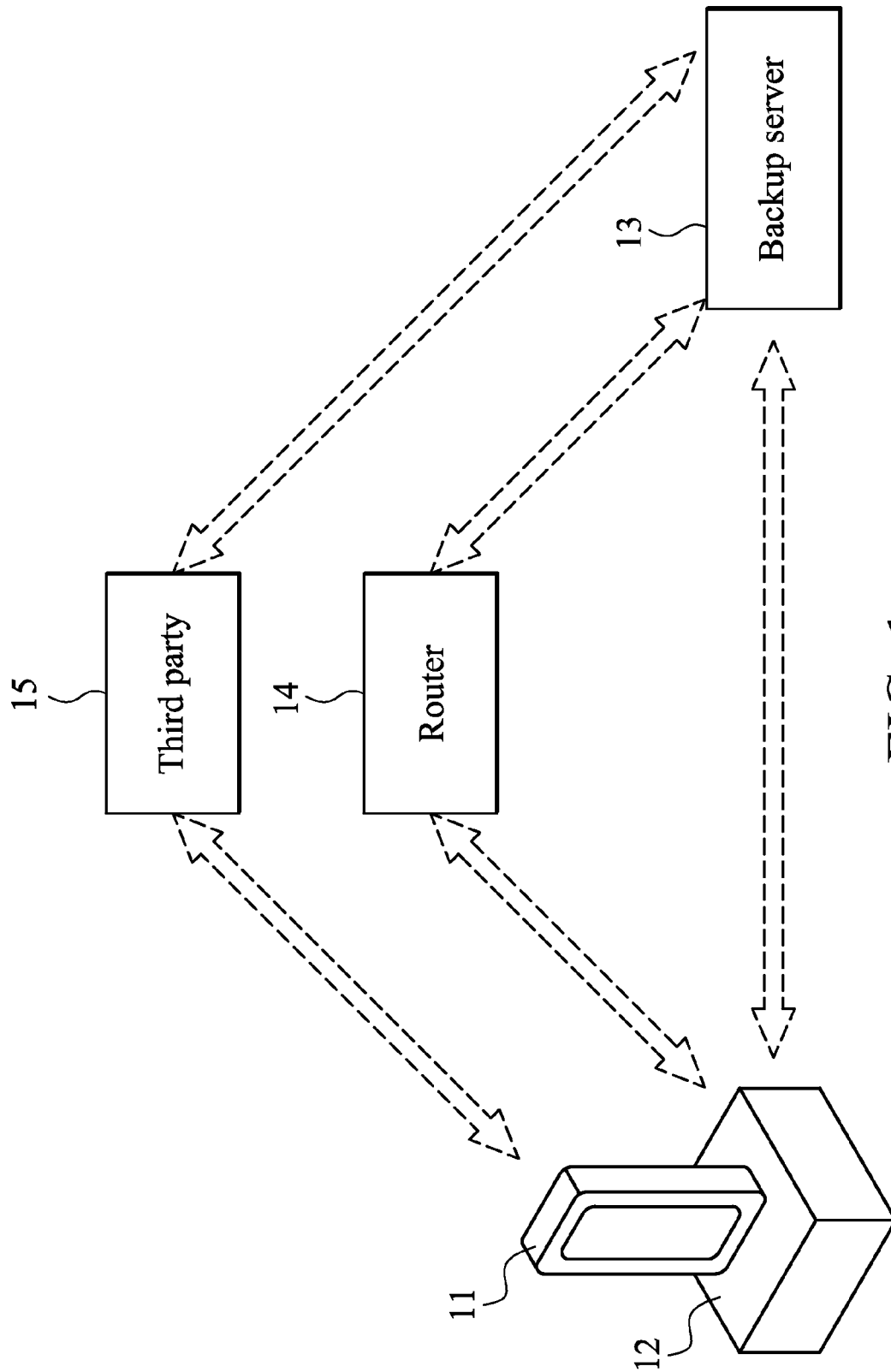
FIG. 1 shows a backup system for a portable device according to an embodiment of the invention.

FIG. 1 shows a backup system for a portable device according to an embodiment of the invention. The portable device 11 may be a smart phone, a personal digital assistant (PDA), a PDA phone or other similar device. In one aspect, the dock 12 is designed to provide external I/O interfaces for the portable device 11. The portable device 11 comprises a backup program to store the data of the portable device 11 to the backup server 13. The backup program is automatically activated when the portable device 11 connects to the dock 12.

When the backup program transmits and stores data of the portable device 11 to the backup server 13, three transmission paths are provided for data transmission. First, the data-under-stored can be transmitted to the backup server 13 via a third party 15. Second, the data-under-stored can be transmitted to the backup server 13 via a router 14. Third, the data-under-stored can be transmitted directly to the backup server 13. The backup program selects at least one transmission path to transmit the data-under-stored to the backup server 13. The backup program may transmit data to the backup server 13 via the described three transmission path simultaneously and the backup server 13 will select one transmission path that has the best network link quality to receive the data.

In another embodiment, the backup program uses a peer-to-peer file sharing mechanism to transmit the data via the described three transmission paths. For example, the backup program divides a first file into a plurality of data segments (or data blocks) and then transmits the segments to the backup server 13 via the described three transmission paths. Due to the network link quality, the original transmission path chosen by the backup server 13 may not always have the best network link quality. Thus, the backup server 13 may monitor the status of data transmissions (or the network link quality or the transmission speed) of the other two transmission paths, and once the backup server 13 finds that the other transmission pats (second data transmission path) has a better network link quality than the current transmission path, the backup changes the current transmission to the second data transmission path and receives the remaining data segments via the second data transmission path. Then, the backup server 13 combines all of the data segments into the first file.

In a second embodiment, the backup program first transmits a test data to the backup server via the described three transmission paths to test the network link quality or transmission speed. When the backup server 13 receives the test data, the backup server 13 transmits an acknowledge information back to the portable device 11. The portable device determines the network link quality of the three transmission paths according to the receiving time of the acknowledge information. The backup program may also record a label of priority of each transmission path. For example, the transmission path passing through the third party 15 is the first path and the priority is 2, the transmission path passing through the router 14 is the second path and the priority is 3, the transmission path directly to the backup server 13 is the third path and the priority is 1. If the portable device 11 finds that the first path and the second path are available for transmitting data, the portable device 11 will chose the first path to transmit data. If the portable device finds that the first and the third path are available for transmitting data, the portable device 11 will chose the third path to transmit data.

In a third embodiment, the backup program transmits a first data to the backup server 13 simultaneously via the described three transmission paths and the backup program or the backup server 13 determines which transmission path to adopt according to some parameters during the data transmission, such as the network link quality or the transmission speed. Once the transmission path is determined, the backup program transmits the data via the adapted transmission path only.

In another situation, the router 14, the portable device 11 and the backup server 13 are at the same local area network (LAN) or a private network, and the third party 15 is at another network. The backup program will prefer to transmit the data via the router 14 or directly to the backup server. If the third party 15 and the backup server 13 are at the same local area network (LAN), and the portable device 11 is at another network, the backup program will prefer to transmit the data via the third party 15. Therefore, the transmission paths used by the proposed backup method comprise two parts, intranet transmission paths and an internet transmission path, and the intranet transmission path is preferred. For example, a user using the portable device 11 is at his home or company and the backup server 13 is also at his home or company. A local area network, wired or wireless network, covering the portable device 11, the router 14 and the backup server 13 is provided. When a user wants to backup the data of the portable device, the backup program will select to transmit and store data to the backup server 13 directly or via the router 14. In another situation, an access point (AP) providing the wireless network covering the portable device 11, the router 14 and the backup server 13 is provided. The backup program may transmit and store data to the backup server 13 via the AP.

The described embodiments are illustrated with the situation that the backup program is built in the portable device 11. In another situation, the backup program is built in the dock 12, and is activated when the portable device connects to the dock 12. The operation of the backup program built in the dock 12 is similar as the described backup program built in the portable device 12, and is not described here for brevity.

Furthermore, the dock 12 may physically connect to a storage medium, such as a USB flash memory device, SD card, memory card or an external hard disk. The backup program built in the dock 12 will automatically backup the data of the portable device 11 to the storage medium when the portable device connects to the dock 12. Please refer to FIG. 2.

Figure 2:
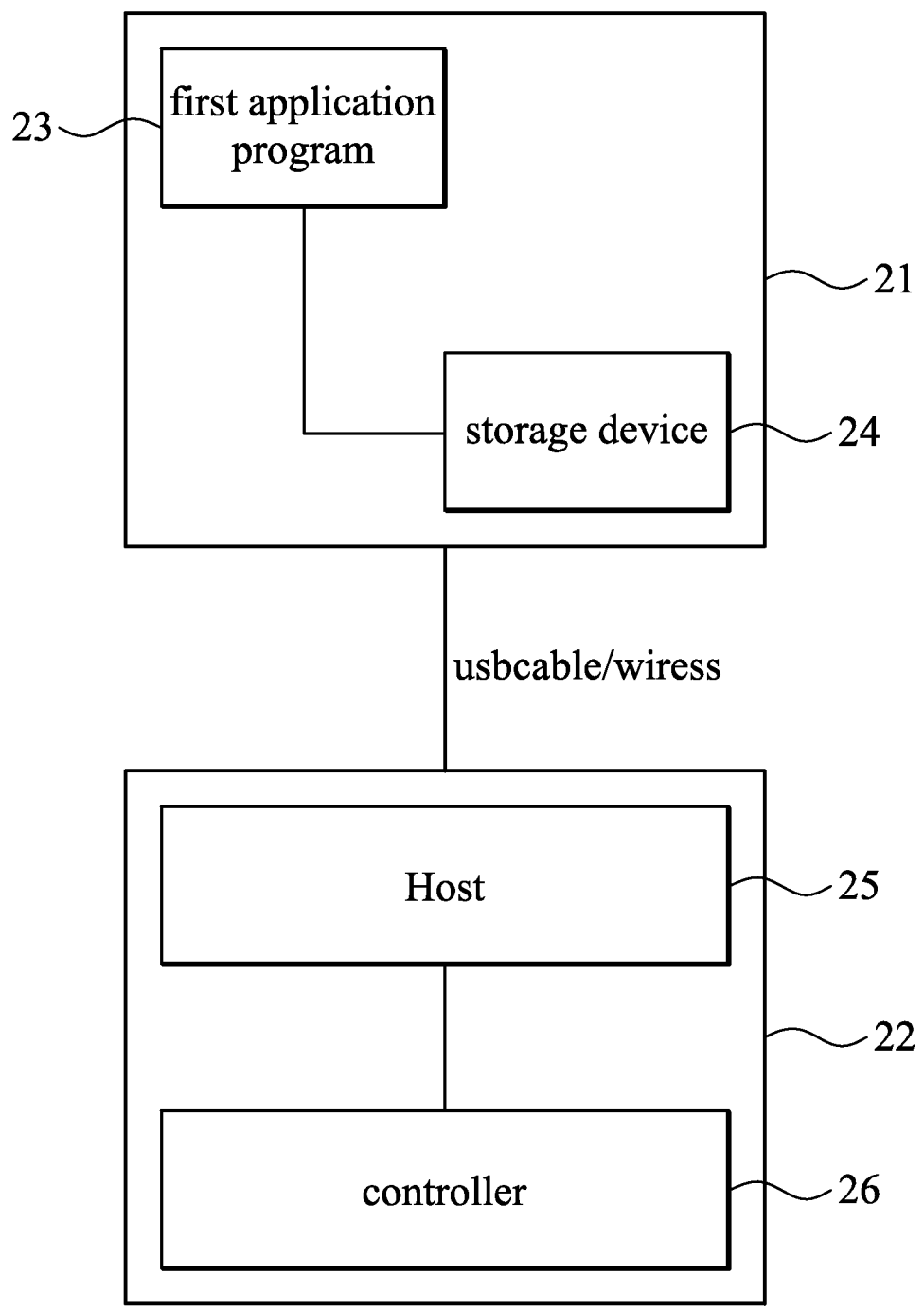
FIG. 2 is a schematic diagram of a backup mechanism for a portable device according to an embodiment of the present invention.

FIG. 2 is a schematic diagram of a backup mechanism for a portable device according to an embodiment of the present invention. The portable device 21 comprises a first application program 23 and a storage device 24, such as a SD card, CF card or flash memory. The backup device 22, which is connected to the dock 12 of FIG. 1, comprises a host 25 and a controller 26. When a user wants to backup files stored in the storage device 24, the user uses the first application program 23 to select and mark files to be backed up and the first application program 23 outputs a log file indicating which files have to be backed up.

When the backup device 22 is electrically connected to the portable device 21, the backup device 22 reads the log file of the portable device 21 to know which files have to be backed up. Then, the backup device 22 acquires and stores the files to be backed up in the host 25. When the backup device 22 is connected to the portable device 21, the control of the portable device 21 is transferred to the controller 26 of the backup device 22. After the backup device 22 finishes the file storing process, the backup device 22 creates and stores a host log file in the portable device 21. The host log file records the status of the file storing process. Finally, the backup device 22 is disconnected from the portable device 22, and the first application program 23 reads the host log file.

The present data backup procedure mainly comprises three parts. First, before the portable device 21 is connected to the backup device 22, the first application program 23 is executed to select and mark files to be backed up by a user. The first application program 23 then creates and stores a log file. The log file contains the information of the files to be backed up. The information may comprise file names of the files to be backed up.

Second, when the portable device 21 is connected to the backup device 12, the control of the portable device 21 is transferred to the backup device 22. In other word, the portable device 21 can be seen as a peripheral device of the backup device 22. The backup device 22 reads the log file and stores the files to be backed up to the host 25. After storing, the backup device 22 creates and stores a host log file in the portable device 11, and breaks down the connection to the portable device 22.

Third, the first application program 23 is executed and reads the host log file to know the status of the backup.

In the present invention, the log file may not only record the information of the files to be backed up, but also a destination folder or path where the files have to be stored.

In another embodiment, the log file contains a timestamp and the backup device 22 also stores the log file from the portable device 21. When the backup device 22 accesses the log file from the portable device 21, the backup device 12 also reads a previous log file stored in the backup device 22, and the backup device 12 only stores the unstored files according to the log file and the previous log file. The backup device 22 comprises a first log file database storing the log files from the portable device 22, and the portable device 21 comprises a second log file data storing the host log files created by the backup device 22. Each time the portable device 21 backups the data or files to the backup device 22, the first application program 23 or the backup device 22 can find a previous host log file or a previous log file to determine which files are new to backup. This also can be applied to the restore mechanism.

The host log file also contains a timestamp, and when the first application program 13 creates the log file, the first application program 23 will check a previous host log file to see whether the current selected files have been stored in the backup device 22. If yes, the current log file will exclude those stored files from the current log file. It is noted that, if the destination folder of the destination paths of the previously stored files is different from the current destination folder of the destination path, then, the stored files will still be stored in the current destination folder of destination path.

The described paragraphs focus on the backup mechanism for the portable device 21. Another restored mechanism for the portable device 21 is discussed in the following. When a user wants to restore some files from the backup device 22 to the portable device 21, the first application program 23 creates a first log file indicating which files have to be restored to the portable device 21. When the backup device 22 is connected to the portable device 21, the controller 26 reads the first log file and restores the requested files to the portable device 21. After the restoring process, the backup device 22 also creates and stores a first host log file to the portable device 21.

Via the first application program 23, a user can appoint data between two dates to be restored from the backup device 22 to the portable device 21. For example, if a user wants to restore the pictures taken from Jan. 1, 2011 to Jan. 10, 2011, a user can input some parameters, such as the date and the type information, via the first application program 23 and then the first application program creates the log file according to the user's inputs. Furthermore, a user can appoint which type of files is to be backed up via the first application program. Similarly, this can also be applied to the restore mechanism.

In the present invention, the backup device 22 may also comprise a second application program for backing up the data of the portable device 11 or restoring the data from the backup device 22 to the portable device. A wireless connection mechanism, security mechanism or synchronization mechanism may also be applied to the portable device 21 and backup device 22.

The backup device 22 may communicate with the portable device 21 via wireless interface, such as Wifi, WiMax, Bluetooth, IrDa or other wireless interfaces. When a distance between the portable device 21 and the backup device 22 is shorter than a predetermined distance, the backup device 22 automatically mounts the portable device 22 and backups the files in the portable device 21. Furthermore, the backup device 22 can synchronize with more than one portable device or other computing device and backup the data therein.

Figure 3:
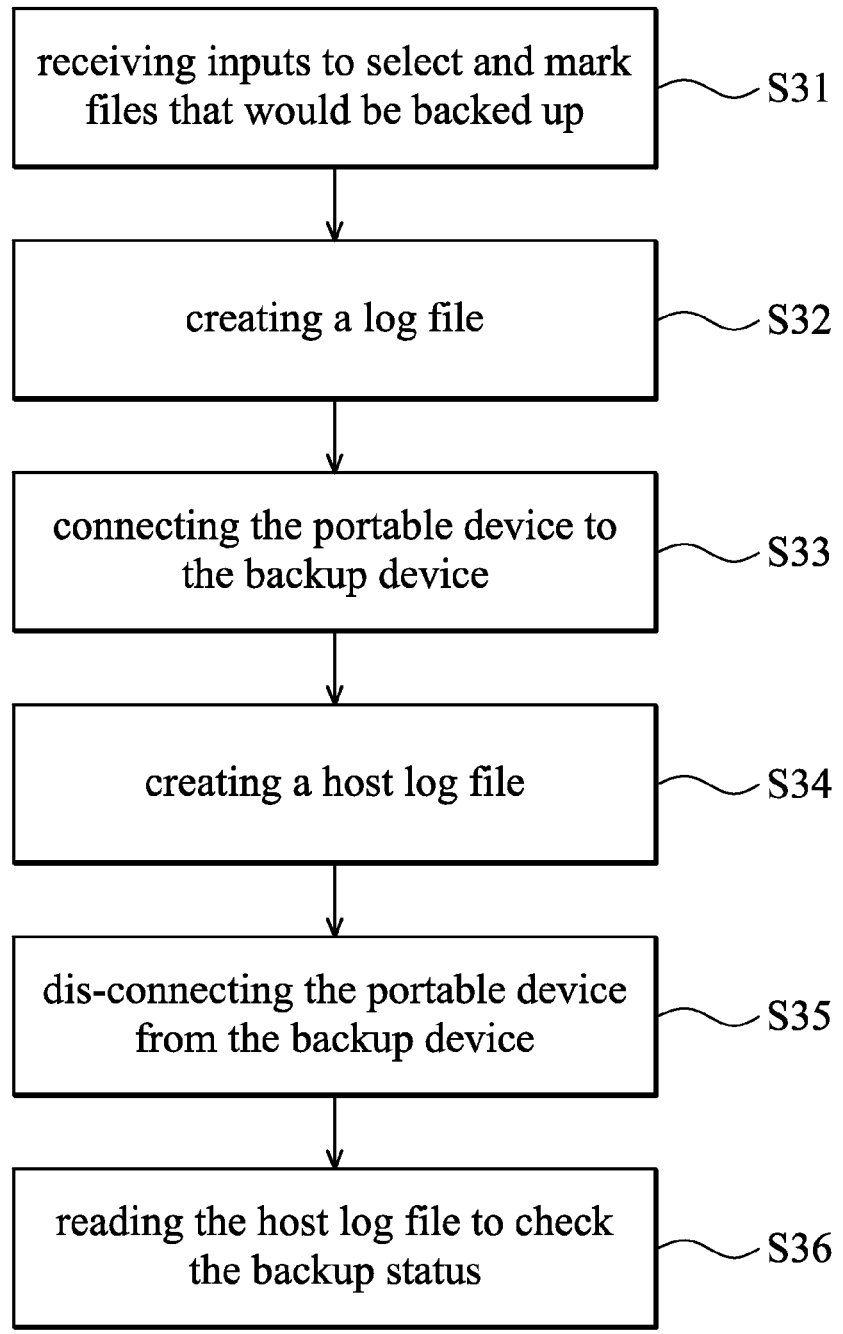
FIG. 3 is a flowchart of a backup method according to an embodiment of the present invention.

FIG. 3 is a flowchart of a backup method according to an embodiment of the present invention. In step S31, the portable device receives inputs to select and mark the files to be backed up. A user can input parameters via a touch panel or keypad of the portable device. Furthermore, voice control may also be applied. In step S32, a first application program of the portable device creates a log file according to a user's inputs. In step S33, the backup device mounts the portable device, and the control of the portable device is then transferred to the backup device. The backup device reads the log file and stores the files from the portable device to the backup device according to the log file. In step S34, when the backup device finishes storing data, the backup device creates and stores a host log file in the portable device. In step S35, the backup device dismounts the portable device. The portable device may be physically disconnected from the backup device or the backup device just transfers the control of the portable device back to the portable device. In step S36, the portable device reads the host log file to check the status of the backed up file.

Figure 4:
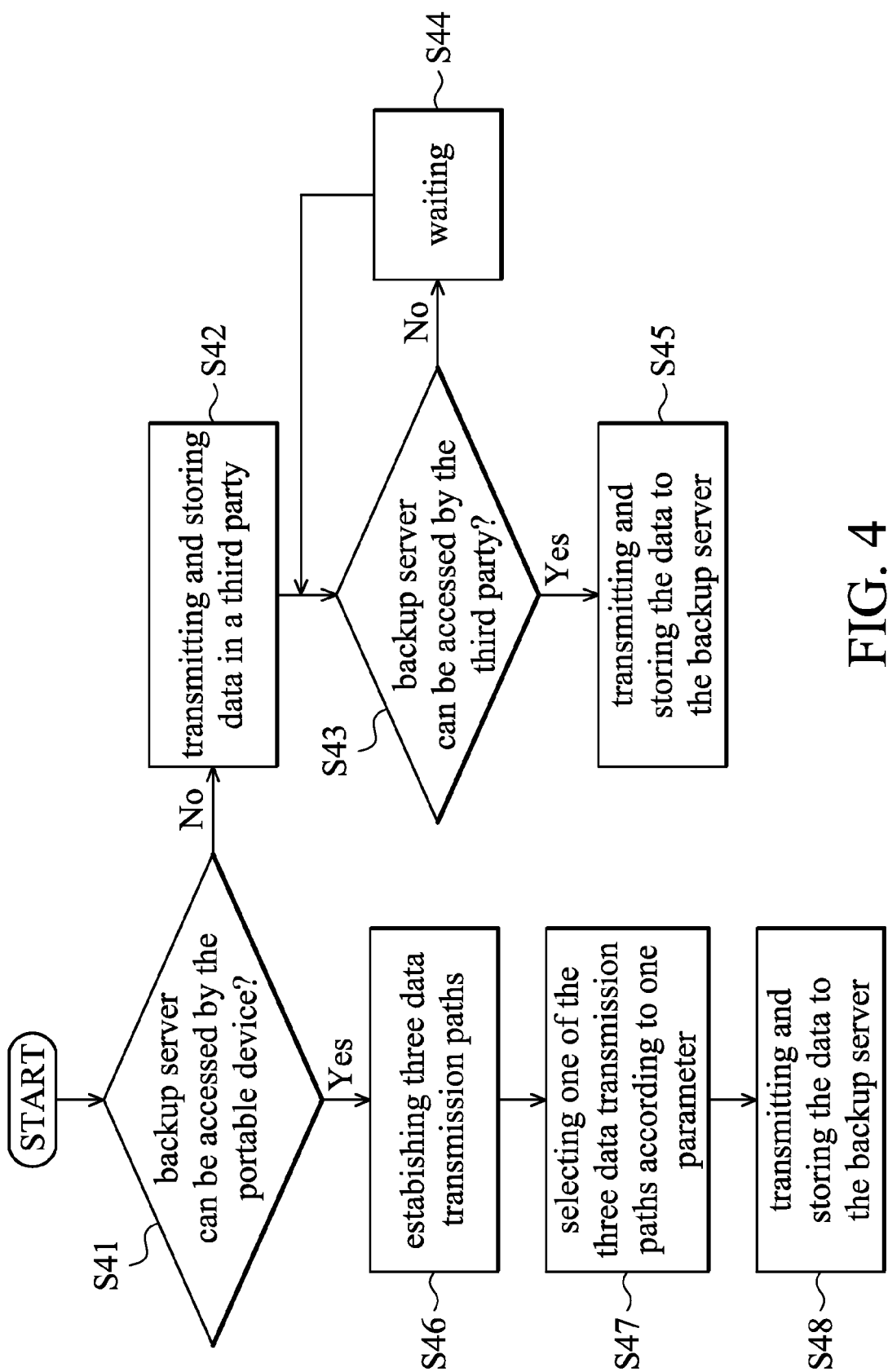
FIG. 4 is a flowchart of a backup method according to another embodiment of the present invention.

FIG. 4 is a flowchart of a backup method according to another embodiment of the present invention. When a portable device wants to back up a first data to a backup server, the backup method of FIG. 4 is executed. The backup method is executed by a processor of a portable device. In step S41, the portable device first determines whether the backup server can be accessed? If yes, the processor then executes step S46. If no, the processor then executes step S42. In step S42, the portable device transmits and stores the first data to a third party. After step S42, the third party then checks whether the backup server is available? If the backup server is still not available, the third party then waits for a duration (step S44), and then the third party executes the step S43 to check whether the backup server is available again? In other words, after the first data is stored in the third party, the third party continuously polls the backup server for a predetermined rate. If the third party finds that the backup server is available, the third party then transmits and stores the first data to the backup server in step S45.

In step S46, the portable device establishes three transmission paths for backing up the first data. The portable device establishes a first data transmission path for backing up the first data to the backup server via a third party. The portable device establishes a second data transmission path for backing up the first data to the backup server via a router. The portable device establishes the third data transmission path for backing up the first data directly to the backup server. It is noted that the third party is not the router. After the three transmission paths are established, the portable device selects one transmission path for backing up the first data according to a parameter in step S47. The parameter may be the network link quality, the transmission speed or a user's preference. In step S48, the portable device transmits and stores the first data via the selected transmission of step S47.

Figure 5:
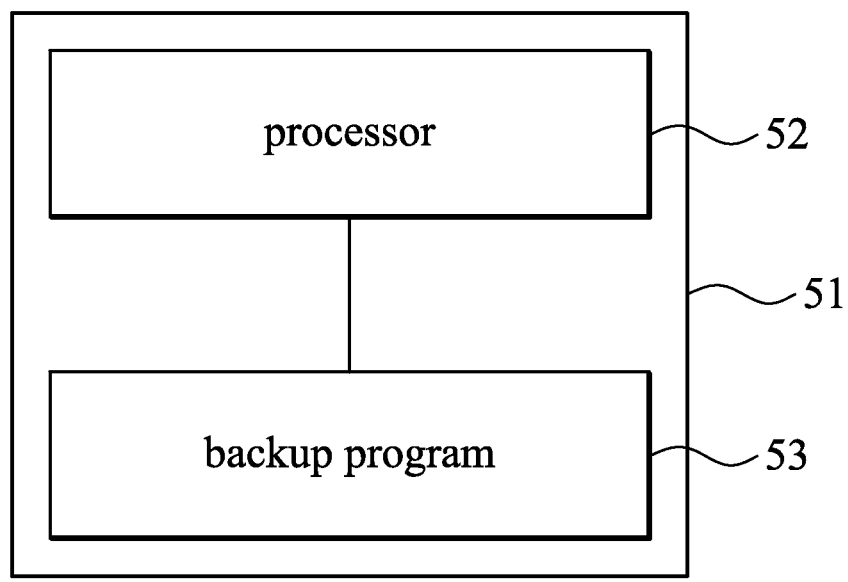
FIG. 5 is a schematic of a portable device with the proposed backup mechanism according to one embodiment of the present invention.

FIG. 5 is a schematic of a portable device with the proposed backup mechanism according to one embodiment of the present invention. The portable device 51 comprises a processor 52 and a backup program 53. When the portable device 51 wants to store a first data to a backup server, the processor 52 executes the backup program 53. The processor 52 first determines whether the backup server can be accessed? If the backup server cannot be reached now, the processor 52 transmits and stores the first data to a third party. The third party will transmit and store the first data to the backup server according to a command generated by the processor when the backup server can be reached. The command may comprise a destination folder or a destination path of the backup server.

When the processor 52 checks that the backup server is available, the processor 52 then establishes three transmission paths and selects only one transmission path to back up data. The detail description can be referred in the following paragraph.

The processor 52 establishes a first data transmission path for backing up the first data to the backup server via a third party. The processor 52 establishes a second data transmission path for backing up the first data to the backup server via a router. The processor 52 establishes the third data transmission path for backing up the first data directly to the backup server. It is noted that the third party is not the router. The router can be changed to be a network-connected electronic device that can transfer the received data to a designated backup server. After the three transmission paths are established, the processor 52 selects one transmission path for backing up the first data according to a parameter. The parameter may be the network link quality, the transmission speed or a user's preference. In the end, the processor 52 transmits and stores the first data via the selected transmission.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backup method for a portable device to back up a first data to a backup server, comprising:
   determining whether the backup server can be accessed;

when the backup server can be accessed, establishing a first data transmission path that the first data would be backed up to the backup server via a third party, a second data transmission path that the first data would be backed up to the backup server via a router, and a third data transmission path that the first data would directly backed up to the backup server;

selecting one data transmission path among the first, second and third data transmission paths according to a parameter; and backing up the first data via the selected data transmission path.

2. The method as claimed in claim 1, further comprising:
when the backup server cannot be accessed, establishing only the first data transmission path and transmitting and storing the first data to a third party.

3. The method as claimed in claim 2, wherein after the first data is stored in the third party, the third party detects whether the backup server can be accessed, and when the backup server can be accessed by the third party, the third party transmits and stores the first data to the backup server.

4. The method as claimed in claim 1, wherein the parameter is a network link quality or a transmission speed.

5. The method as claimed in claim 1, wherein when the portable device and the backup server are in a first network and the third party is in a second network, the first data is backed up to the backup server via the second data transmission path or the third data transmission path.

6. A portable device, comprising:
a backup program; and
a processor, wherein when the backup program is executed by the processor, the processor first determines whether the backup server can be accessed, when the backup server can be accessed, the processor establishes a first data transmission path that the first data would be backed up to the backup server via a third party, a second data transmission path that the first data would be backed up to the backup server via a router, and a third data transmission path that the first data would directly backed up to the backup server, the processor then selects one data transmission path among the first, second and third data transmission paths according to a parameter, and the processor transmits and stores the first data to the backup server via the selected data transmission path.

7. The portable device as claimed in claim 6, wherein when the backup server cannot be accessed, the processor establishes only the first data transmission path and transmitting and storing the first data to a third party.

8. The portable device as claimed in claim 7, wherein after the first data is stored in the third party, the third party detects whether the backup server can be accessed, and when the backup server can be accessed by the third party, the third party transmits and stores the first data to the backup server.

9. The portable device as claimed in claim 6, wherein the parameter is a network link quality or a transmission speed.

10. The portable device as claimed in claim 6, wherein when the portable device and the backup server are in a first network and the third party is in a second network, the first data is backed up to the backup server via the second data transmission path or the third data transmission path.

* * * * *